United States Patent
Kraklow et al.

(10) Patent No.: US 6,500,475 B1
(45) Date of Patent: Dec. 31, 2002

(54) EDIBLE DOUGH SUPPORT

(75) Inventors: Harry K. Kraklow, Eau Claire, WI (US); Edward A. Alesch, Richardson, TX (US)

(73) Assignee: Schwan's Sales Enterprises, Inc., Marshall, MN (US)

( * ) Notice: Subject to any disclaimer, the term of this patent is extended or adjusted under 35 U.S.C. 154(b) by 0 days.

(21) Appl. No.: 09/544,922

(22) Filed: Apr. 7, 2000

Related U.S. Application Data
(60) Provisional application No. 60/176,241, filed on Jan. 14, 2000.

(51) Int. Cl.⁷ .............................................. A21D 10/00
(52) U.S. Cl. ........................ 426/94; 426/275; 426/496; 426/549
(58) Field of Search ........................... 426/94, 275, 89, 426/138, 549, 496, 302, 277

(56) References Cited

U.S. PATENT DOCUMENTS

| | | | |
|---|---|---|---|
| 3,886,112 A | | 5/1975 | Watson ...................... 260/33.4 |
| 4,066,796 A | * | 1/1978 | McKee ........................ 426/302 |
| 4,603,051 A | | 7/1986 | Rubenstein et al. ......... 426/138 |
| 4,836,383 A | | 6/1989 | Gordon et al. .............. 206/611 |
| 5,035,907 A | | 7/1991 | Phillips et al. .............. 426/383 |
| 5,089,307 A | * | 2/1992 | Ninomiya et al. .......... 426/138 |
| 5,202,138 A | * | 4/1993 | Stypula ........................ 426/94 |
| 5,480,798 A | | 1/1996 | Gysler et al. ............. 435/255.2 |
| 5,716,658 A | | 2/1998 | Donnelly et al. ........... 426/420 |
| 5,736,178 A | * | 4/1998 | Cook et al. ................. 426/138 |
| 5,775,208 A | | 7/1998 | Kimple ........................ 99/422 |
| 5,919,508 A | | 7/1999 | Donnelly et al. ........... 426/420 |
| 5,928,692 A | | 7/1999 | Mayfield ...................... 426/89 |
| 5,965,708 A | * | 10/1999 | Bassi et al. ................. 426/656 |

FOREIGN PATENT DOCUMENTS

| | | |
|---|---|---|
| EP | 0 628 256 B1 | 8/1997 |
| GB | 2220346 A | 1/1990 |
| WO | 9611577 * | 4/1996 |

OTHER PUBLICATIONS
Food Technology, "Edible Films and Coatings from Wheat and Corn Proteins," Oct. 1990, pp. 63–69.

* cited by examiner

*Primary Examiner*—Lien Tran
(74) *Attorney, Agent, or Firm*—Merchant & Gould P.C.

(57) ABSTRACT

To facilitate baking a frozen dough product in an oven, the dough product is formed over an edible film or substrate that may have a plurality of die-cut holes. This film serves as a baking substrate and obviates the need for a baking pan. The film is formed with the dough product that adheres to the dough during pressing. The end user may thus remove the frozen dough product together with the film from a packing preform and place the dough product and film assembly on an oven rack for baking. As the dough thaws, the crust will loose its stiffness. The film however, will prevent the more pliable crust from distending through the oven rack before the dough has become baked and rigid. The film forms a support that restrains flow of the dough, while at the same time the permits the escape of gases from the bottom of the crust and ensures uniform baking. During baking, the film is absorbed into the dough product. The finished baked dough product, such as dinner rolls or a pizza crust, may then be removed from the oven, and the baked dough product may be served directly for consumption.

1 Claim, 8 Drawing Sheets

EDIBLE DOUGH SUPPORT

CROSS-REFERENCE TO RELATED APPLICATIONS

This application claims the benefit of provisional application, Application Ser. No. 60/176,241, filed on Jan. 14, 2000.

BACKGROUND OF THE INVENTION

1. Field of the Invention

The present invention relates to baked goods and baking accessories in general, and in particular to preformed dough foodstuffs prepared for cooking and consumption at a later time and to articles for assisting in the baking of such foodstuffs. More particularly, the present invention relates to the use of edible films for supporting dough products.

2. Discussion of the Related Art

Freshly baked products have long been enjoyed by home consumers and restaurant patrons. Preparing pastries and bread products such as pizza crusts and rolls, however, requires ready supplies of perishable materials, skill, and most importantly, time. To minimize the impact of these factors and reduce preparation time, home consumers and commercial bakers have a need for dough products that may be placed directly in an oven and baked for immediate consumption and/or sale. Likewise, these preformed dough products may help to reduce labor costs and order preparation times for restaurants and pizzerias. In the past, pizza crusts have been supplied to pizza makers and other users as prebaked, preformed frozen or refrigerated crusts, with the cheese and other toppings being added to the crust at the time of baking or processing for further sale. Pizza crusts of this sort were typically formed by a die-stamping or filming process. In one process, the crusts were baked within a retaining ring or platen, and then packaged. By partially or completely baking the product prior to removal from the baking pan, the desired molded shape was preserved. A drawback of prebaked bread products is that the final article is twice-baked and does not retain the moist rich texture and taste of a freshly-baked product. With these products, at least a semblance of freshness has been made by providing pizza crusts with a central portion which is unbaked and frozen. The unbaked preformed central portion will rise a certain amount when baked, and provides an improved texture and taste. However, this is still short of a freshly baked dough.

Historically, it was known in the prior art to use edible films as barriers primarily to protect various foods and pharmaceuticals from spoilage. For example, peanuts and various encapsulated medicines are protected with plasticized edible films.

Moreover, as is known to those skilled in the art, some foods require additional care and handling at the various stages of their production. For example prior to freezing, frozen food products can be difficult to handle. The same is true for these products when they become thawed. In the past, paper, metal, or plastic containers and supports have been used to package frozen foods. However, such packaging is difficult to reuse and recycle. Thus, it often winds up in garbage piles and landfills across the world. As such materials are not generally easily biodegradable, they cause numerous long-term problems including waste of natural resources and land, as well as, disease. Needless to say, it is desirable to an environmentally friendly package for such frozen food products.

When placed directly in a consumer's oven, frozen dough products may deform over the parallel bars of the oven rack and be subjected to uneven baking. Nevertheless, baking on a solid tray or pan may restrict the escape of gases from the dough, and inhibit ideal baking conditions.

One previous solution is U.S. Pat. No. 5,919,508 to Donnelly, et al. (hereby incorporated herein by reference). However, one drawback of that invention is that after baking the preferred paperboard substrate must be disposed of, thereby creating unwanted waste.

Thus, what is needed is a dough product assembly that may be formed into a desired shape and delivered in frozen form to an end user for immediate baking and consumption without excess waste or clean-up.

What is also needed therefore is environmentally safe and sufficiently strong packaging material for frozen food products. Further, what is also needed is a package that is easily disposed of after use. Additionally, what is needed is packing material that is edible yet provides sufficient support for food products during freezing and thawing so that the products hold their shape. Until now these requirements have not been fully met by the prior art without incurring various disadvantages.

Moreover, as the food processing business is very competitive, a preferred solution will be seen by the end-user as being cost effective. A solution is cost effective when it is seen by the end-user as compelling when compared with other potential uses that the end-user could make of limited resources.

The below-referenced U.S. patents and other documents disclose embodiments that were at least in-part satisfactory for the purposes for which they were intended. The disclosures of the below-referenced prior United States patents and other documents in their entireties are hereby expressly incorporated by reference into the present application for purposes including, but not limited to, indicating the background of the present invention and illustrating the state of the art.

In the past others, most notably Aristippos Gennadios and Curtis L. Weller in Edible Films and Coatings from Wheat and Corn Proteins, Food Technology, October 1990 at pages 63–69, described the use of fibers, such as wheat and corn, to produce edible packaging materials.

Still others, like U.S. Pat. No. 3,886,112 to Watson, disclose a water-soluble packing material made with an extruder. U.K. Pat. App. No. 2,220,346 A discloses a baking film of greaseproof paper or parchment coated with silicon. U.S. Pat. No. 5,035,907 discloses a marshmallow based edible film. U.S. Pat. No. 5,928,692 discloses an edible film that can be sprayed on food products. U.S. Pat. No. 4,603,051 discloses an edible food container with a moisture resistant barrier coating.

SUMMARY AND OBJECTS OF THE INVENTION

The dough products of the present invention are generally formed of proofed dough that is molded to a desired shape and frozen on a paperboard packing preform without being subjected to baking. This allows the frozen product to be formed in such a manner to prevent the yeast from being killed.

During the forming process, an edible baking film or substrate is positioned between the dough and the preform. Thus, when the dough is pressed and formed onto the preform, the baking substrate is engaged to the dough. The assembly of dough and baking substrate is then packaged with the preform and frozen for delivery. The product consumer removes the assembly (frozen dough product and baking substrate) from the preform and positions the assembly in an oven on the bars of a conventional oven rack. The substrate prevents the dough product from distortion on the oven rack bars, while allowing the escape of gases from the underside of the dough product, and thus enabling proper baking. Additionally, perforations may be added to the substrate to allow preferential radiant heating to particular regions of the baking product, to control relative baking rates, assure even baking of a nonuniform product, to better secure the substrate to the dough product, and to prevent slippage in assembly.

During baking, the edible substrate is absorbed into the underside of the dough product. Upon removable from the oven, the dough product is ready for immediate consumption. Because the substrate dissolves into the crust during baking, there is no additional waste to deal with or pan clean-up required.

It is an object of the present invention to provide a frozen dough product assembly that may be placed directly in an oven for baking without the need for a pan.

It is another object of the present invention to provide a frozen dough product assembly that retains the shape of the dough product when baked on an oven rack.

It is a further object of the present invention to provide a dough product assembly that allows gases to escape from all sides of the product when baked in an oven.

It is an additional object of the present invention to provide an article for controlling the radiant heat transmitted to a dough product within an oven to thereby control the baking of the product across variant regions.

It is yet another object of the present invention to provide a frozen dough product assembly which includes an edible baking substrate.

Still another object of the present invention is to provide a frozen dough assembly that minimizes clean-up and waste.

Another object of the invention is to reduce labor costs and order preparation times for baked products.

Yet another object of the present invention is to provide a wheat-based baking substrate that is absorbed upon baking.

Another object of the invention is to provide an apparatus that has one or more of the characteristics discussed above but which is relatively simple to manufacture and assemble using a minimum of equipment.

Another object of the invention is to provide a method that is predictable and reproducible, thereby decreasing variance and operating costs.

Another object of the invention is to provide a method that has one or more of the characteristics discussed above but which is relatively simple to setup and operate using relatively low skilled workers.

In accordance with a first aspect of the invention, these objects are achieved by providing a dough product support assembly comprising a portion of dough and an edible film for supporting the portion of dough. In another embodiment, the invention includes a frozen food support assembly comprising an edible, soluble film including wheat fibers, starch, and gum for binding the wheat fibers.

In accordance with another aspect of the invention, these objects are achieved by a method of supporting raw dough comprising the steps of providing a wheat-based edible film, depositing a portion of raw dough on the edible film, heating the raw dough and the film in an oven to a temperature of about 180 degrees Fahrenheit, disintegrating the film through baking to leave a baked, unsupported dough structure, and removing the dough structure from the oven for consumption.

To satisfy the above objectives, the invention may also include a method of facilitating the baking of frozen dough products in an oven comprising the steps of forming a portion of dough, forming a baking substrate, flattening the dough on the substrate, adhering the substrate to the dough, freezing the dough and the substrate in a freezer, placing the frozen dough and the substrate in an oven for baking, supporting the dough while thawing with the substrate, allowing radiant heat to bake the dough, absorbing the substrate into the dough during baking, and removing the baked dough for serving. Alternatively, the invention may also include a process of forming dough comprising the steps of placing a quantity of dough on an edible film, positioning the dough on the film beneath a die, pressing the die over the dough to form the dough into a desired shape, forcing the dough into intimate contact with the edible film, and freezing the formed dough on the edible film.

Further, the invention may include a method of supporting dough comprising the steps of providing a wheat-based dough support member, coating the dough support member with a water-based mixture to provide additional stability, placing a portion of dough on the dough support member, baking the dough and the dough support member in an oven until the dough is rigid, removing the dough from the oven, and serving the dough for human consumption.

Moreover, the invention may include a method of manufacturing an edible dough support film, comprising the steps of laying a pliable film on a conveyor, flattening the film with a rolling drum, drying the film, and preparing the film for transport.

The above methods and processes may contain additional steps, such as, rolling the film into rolls prior to transport, transporting the film, unrolling the film rolls, and cutting the film into shapes appropriate for use with frozen dough products. Additionally, these may include the following steps as well: placing a cardboard preform on a conveyor, spraying the preform with a spray (e.g. food-grade oil) a first time, sprinkling the preform with cornmeal, spraying the preform with a spray a second time, and placing the film on the perform. After the above steps are completed, the following steps may also take place: placing a quantity of dough on the film, positioning the dough on the film beneath a die, pressing the die over the dough to form the dough into a desired shape, and freezing the formed dough on the edible film.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DESCRIPTION OF PREFERRED EMBODIMENTS

The present invention and the various features and advantageous details thereof are explained more fully with reference to the non-limiting embodiments described in detail in the following description.

Figure 1:
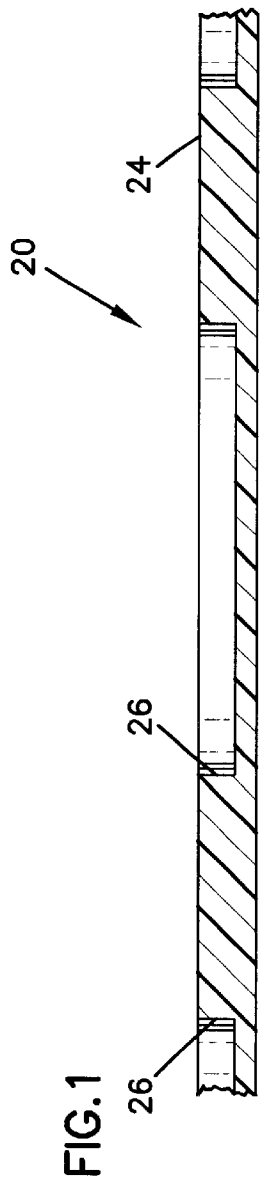
FIG. 1 is a cross-sectional view of a pizza crust tray.
Figure 6:
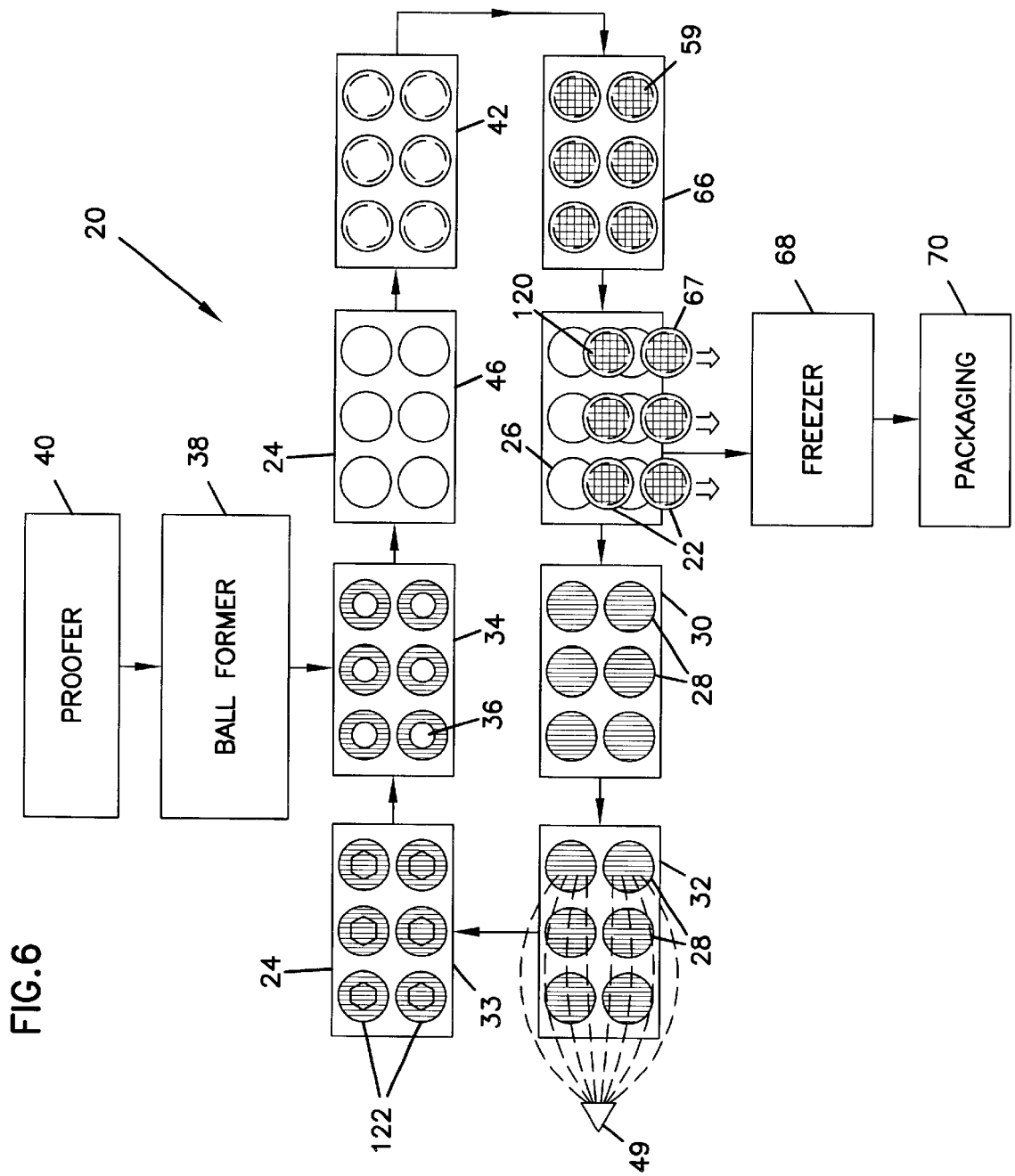
FIG. 6 is a flow chart illustrating the dough forming process of this invention.
Figure 7:
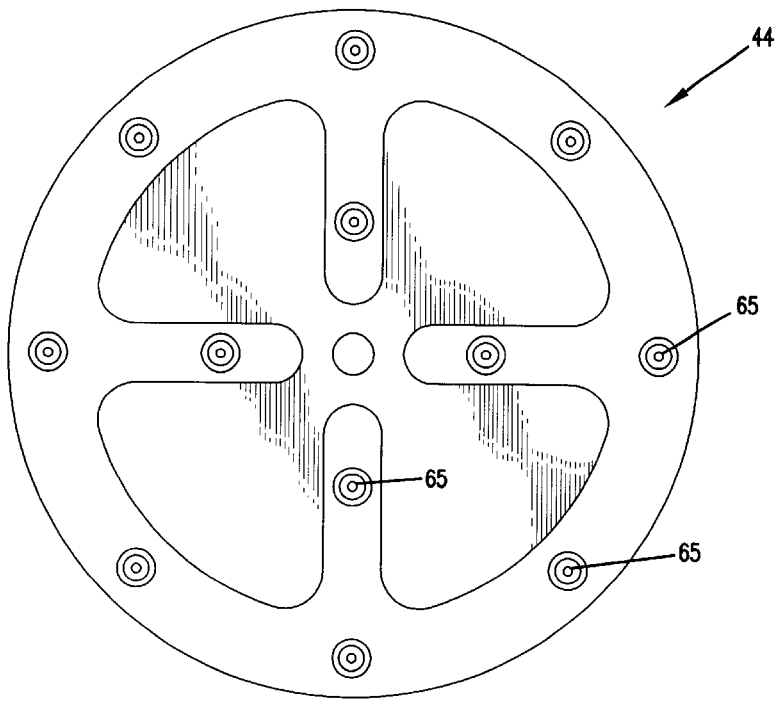
FIG. 7 is a top plan view of the dough-forming die of FIG. 4.

Referring more particularly to FIGS. 1–15, wherein like numbers refer to similar parts, a pizza crust forming apparatus 20 is shown schematically in FIG. 6. Pizza crusts 22 are formed preferably in platens or trays 24, which may be conveyed around a looped path by conventional means, such as hydraulic or pneumatically actuated pusher arms. Each tray 24, as shown in FIG. 1, has an array of circular openings 26 which accept corrugated paperboard preforms 28 therein. The openings 26 are blind holes that are formed in the tray 24, and allow an array of preforms 28 to be conveyed simultaneously. The blind holes have sidewalls 52 which surround the preforms. The trays 24 are preferably formed of plastic such as Teflon or other low friction material. The pusher arms are actuated intermittently to advance the trays 24 in steps, with pauses between tray motions for operation of the apparatus on the preforms 28 and dough deposited thereon.

As shown in FIG. 6, circular corrugated preforms 28 are loaded into the trays 24 at a loading station 30. The preforms 28 may be manually set in position, or may be dropped into place by an automatic dispenser. From the loading station 30, the trays 24 are conveyed to a spray station 32 where a spray, such as a food-grade oil or saline solution, is sprayed on to the preforms 28 by a nozzle 49 to facilitate later release of the crust 22 from the preform 28. Such spray, which may include saline or other solution, also allows an edible sheet or film 122 (described further below) to hold its position during assembly. The spraying may also include a cornmeal product.

Figure 13B:
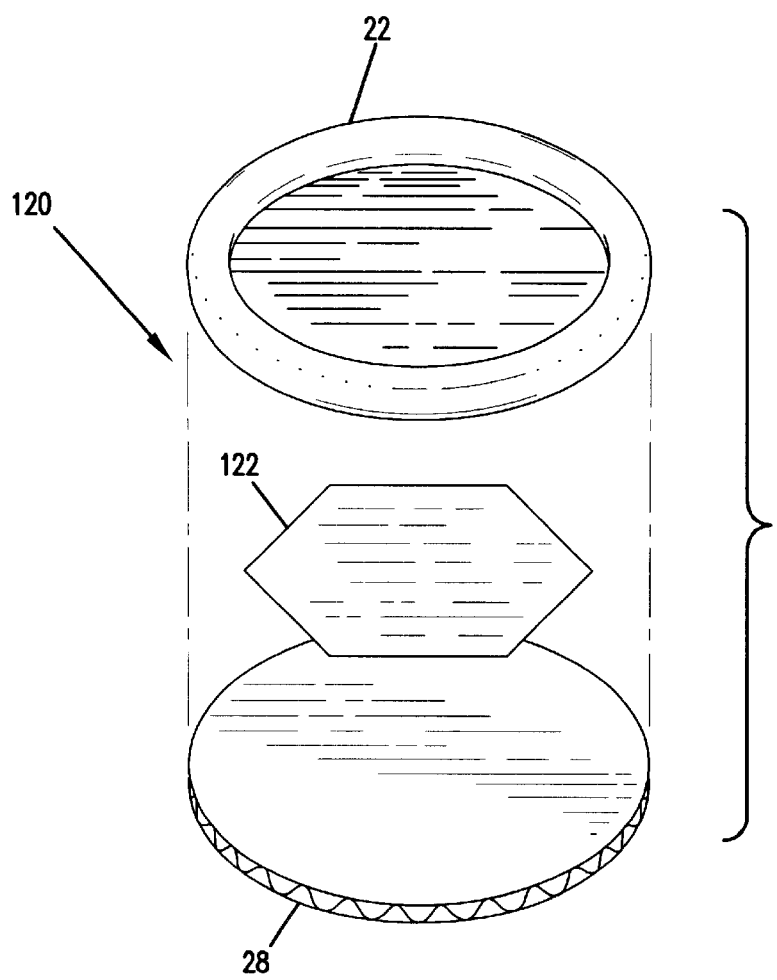
FIG. 13B is an exploded isometric view of a further embodiment of the baking substitute film that is positioned between the preform and crust and pressed into the crust for support of the baking dough product on an oven rack.
Figure 13A:
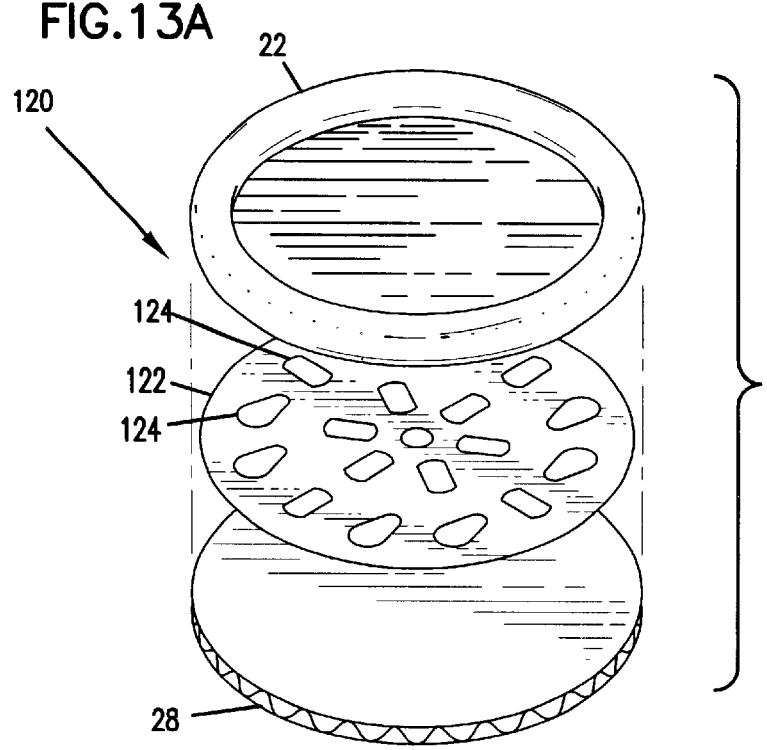
FIG. 13A is an exploded isometric view of one embodiment of the baking substrate film that is positioned between the preform and crust and pressed into the crust for support of the baking dough product on an oven rack.

To facilitate baking of the crust or other dough product 22 of this invention in an oven having racks formed of aligned bars, the dough product 22, such as the crust shown in FIG. 13A and FIG. 13B, is formed over an edible sheet or film 122 which acts as a baking substrate. The film 122 is preferably made of wheat. If it is desirable to limit film 122 from direct consumer view, cornmeal may preferably be added to film 122. One preferred formulation by weight in slurry form is: 91% water, 7% modified wheat fiber, 2% fine cornmeal. However, a variety of compositions of film 122 are possible including any combination of one or more of the following: cottonseed fiber; salt, wheat flour, water and L-cysteine; 2 parts water, and 1 part solids; starch, wheat fiber, gum, and cornmeal; sodium, water, and extenders; food-grade cellulosic material; hydroxypropylmethylcellulose; wheat starch, L-cysteine hydrochloride, and ammonium sulfate; water and wheat fiber; food grade, edible, non-allergenic, refined cellulose; wheat fiber and maltodextrin; xanthan gum, guar gum, galactomannans; a hydrocolloidial stabilizer; cellulose, cellulose gum, and wheat fiber. All materials should be FDA approved. The film is preferably thin so that it can be absorbed into the crust of the dough product during baking. A thin film also lessens difficulty in any cutting of the baked product. For example, the film may be between 0.1 and 5 millimeters, and is preferably between 0.5 and 2 millimeters. Alternatively, a film 13 to 15 thousandths of an inch thick may be used.

Figure 14:
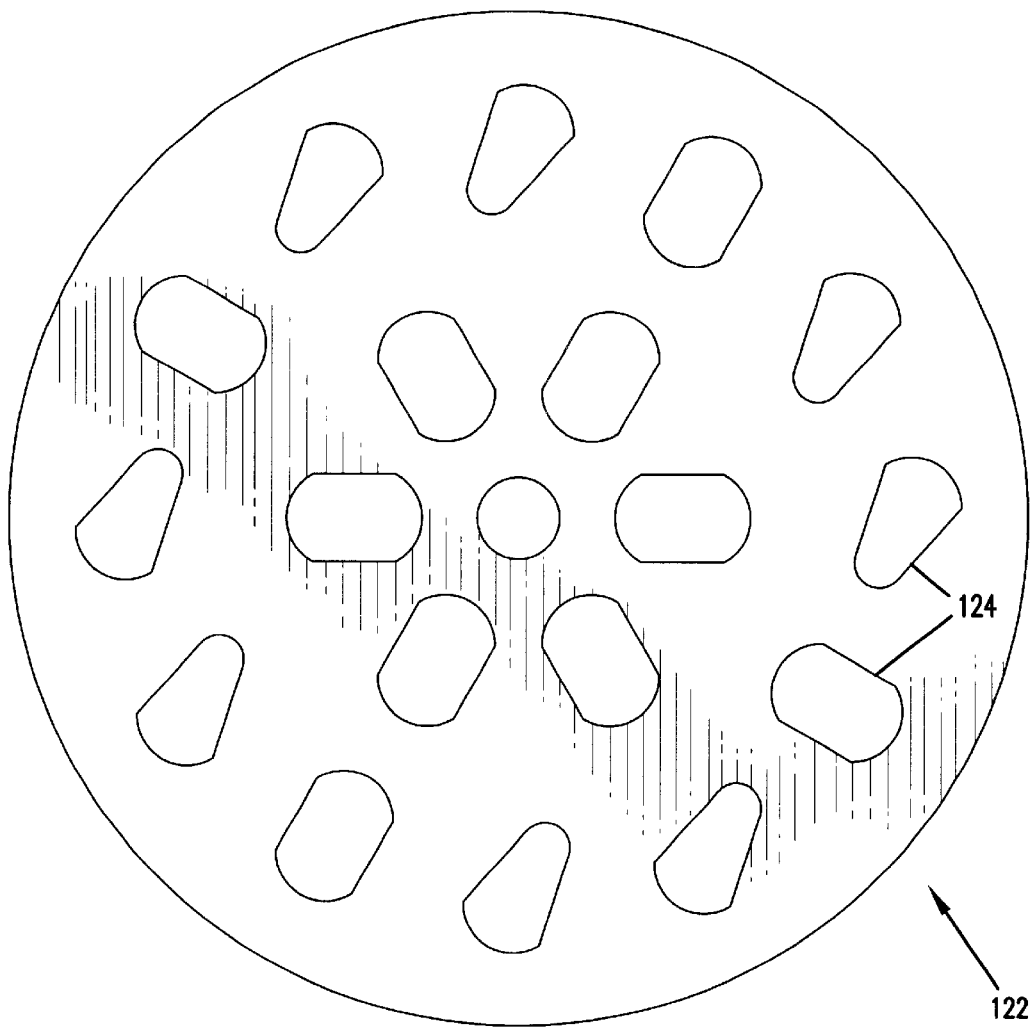
FIG. 14 is a top plan view of a baking substrate film of this invention.

As shown in FIG. 14, one embodiment of the film 122 has a plurality of die-cut holes 124. This film 122 is formed with the dough product 22 during the forming process as described below. As shown in FIG. 13B, a further embodiment of film 122 is provided. Film 122 is preferably hexagonally shaped to allow for ease and economy of manufacture. The surface of film 122 may also be less than the surface area of crust 22. Such dimensions allow for reduced cost of film 122 and increased likelihood that crust 22 will completely overlay film 122.

As shown in FIG. 6, the film 122 is positioned on the preform 28 at station 33 prior to pressing the dough into shape. The film 122 is preferably smaller in area than the preform 28 so that the dough 22 will better lock to the preform 28. The film 122 is thus preferably formed with the crust 22 at the pressing station 46. In one embodiment, the dough of the crust extends through the holes 124 to the preform 28 and locks the film 122 to the dough.

The end user may thus remove the frozen crust 22 together with the film 122 from the preform 28 and place the assembly on an oven rack for baking. As the dough thaws, the crust will loose its stiffness. The film 122, however, will prevent the more pliable crust from distending through the oven rack before the dough has become baked and rigid. The film 122 does this by forming a backing that restrains flow of the dough.

A plurality of naturally occurring small holes in the film 122 allow gases to escape in order to more uniformly bake the crust. During baking, the film 122 is generally absorbed into the crust. Thus, the finished baked crust 22 may be removed from the oven with the film 122 attached thereto. The film 122 is virtually invisible to the general public, especially where a first layer of cornmeal is sprayed to the preform 28 prior to placing the film 122 in position.

Alternatively, the film 122 may be in capsulated by (or inserted within) the dough to lend support and structural stability. Further uses may include adding flavor or leavening properties to the film 122.

In one embodiment, the die-cut holes 124 are also used to permit the escape of gases from the bottom of the crust to ensure uniform baking. It should be noted that although a pattern of generally radial slots has been illustrated, alternative patterns of slots, holes, and other shapes may also be used.

Figure 2:
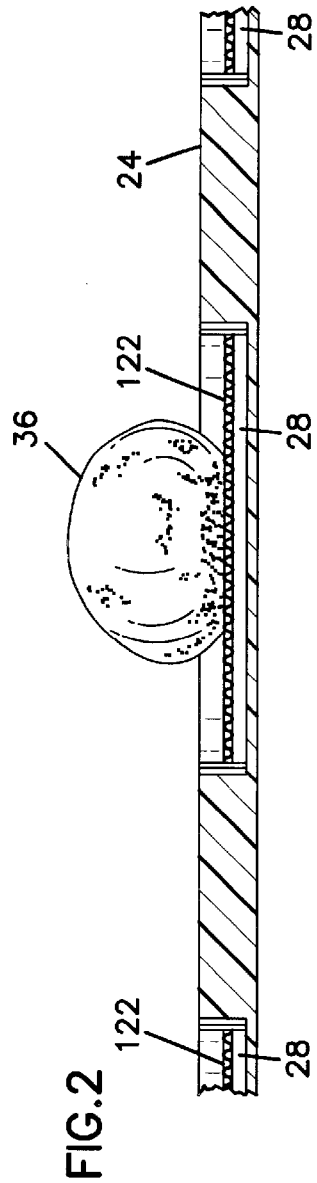
FIG. 2 is a cross-sectional view of the tray of FIG. 1 loaded with corrugated paperboard packing preforms and baking substrates onto which balls of dough have been placed.

As best seen in FIG. 6, when trays 24 enter the line, preferably they pass from the spray station 32 to a film or baking substrate deposit station 33. A nozzle 49 sprays oil onto the preforms 28 so that the substrate 122 sticks to the preform 28. From there, the trays 24 go to the dough deposit station 34, where balls of proofed dough 36 are dropped onto the preforms 28, as shown in FIG. 2. The balls 36 are supplied from a ball former 38 that receives proofed dough from the proofer 40. The ball former 38 and proofer 40 are conventional and well known in the art.

It is also contemplated that an additional spray station may be added. This spray station would be necessary if cornmeal or some other seasoning is added to the film 122. In this case, the oil would help such seasoning adhere to the film 122. In another alternative embodiment of the film 122, seasonings such as garlic could be added directly to the film during its forming process. Additionally, other materials such as leavening agents may be added to the film formula.

Figure 3:
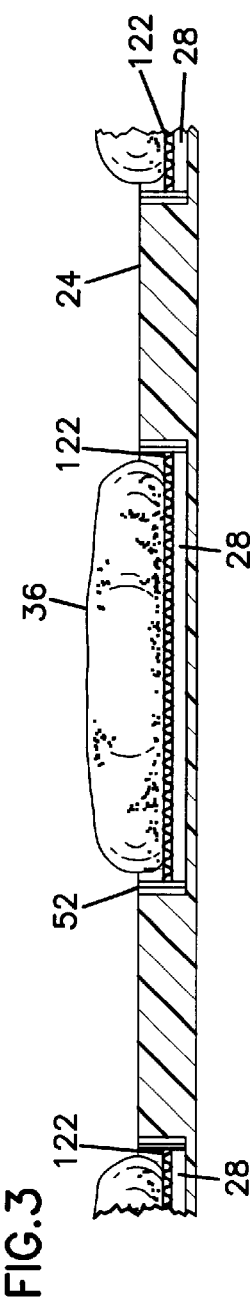
FIG. 3 is a cross-sectional view of the tray of FIG. 2 after the dough ball has been flattened.

Continuing down the line shown in FIG. 6, the trays 24 may move directly from the dough deposit station 34 to a molding station 42. However, to reduce the travel of the dies 44, the trays 24 preferably pass first through a pressing or flattening station 46, where flat plastic blocks reduce the height of the balls of dough 36 by flattening them onto the preforms 28, as shown in FIG. 3.

Figure 4:
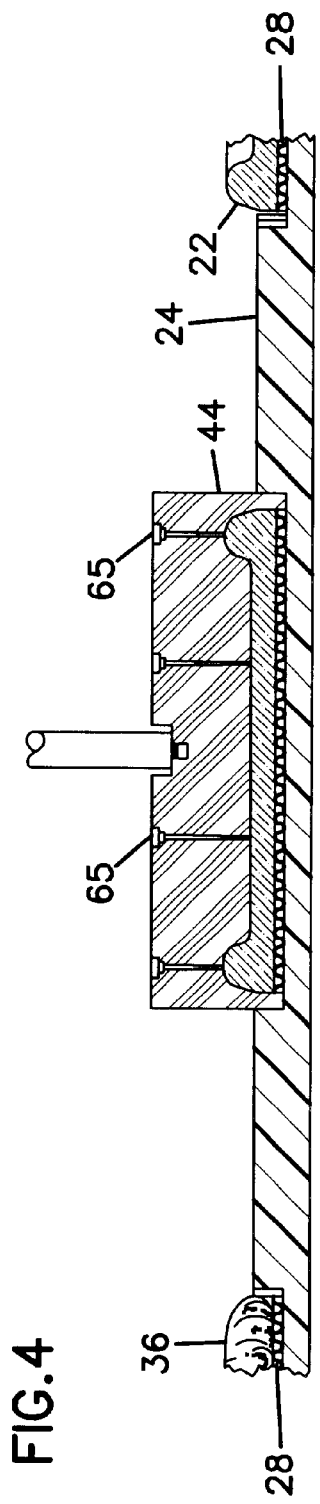
FIG. 4 is a cross-sectional view of the tray of FIG. 3 positioned beneath a plurality of high pressure dough-forming dies.
Figure 5:
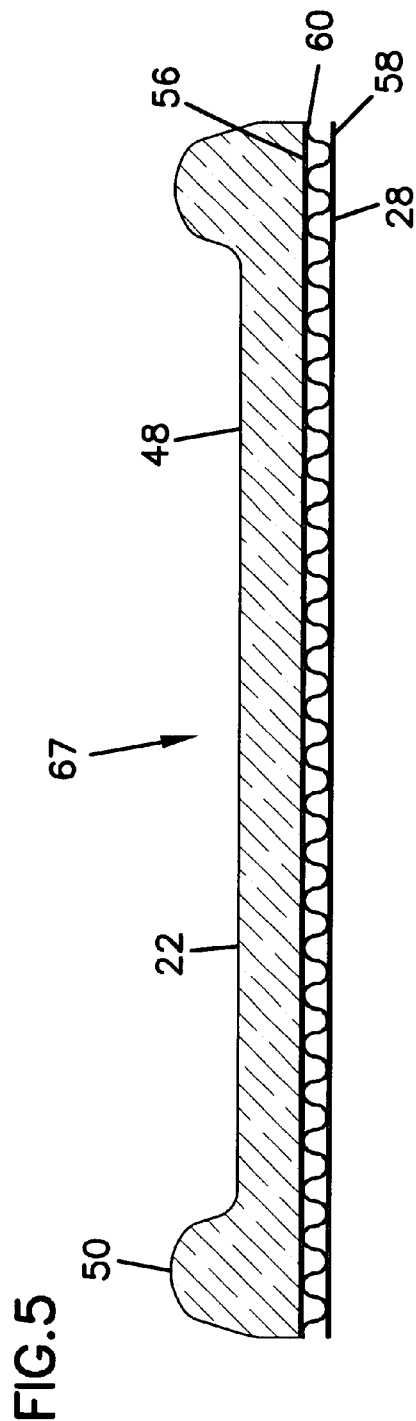
FIG. 5 is a cross-sectional view of the pizza crust, substrate and preform of FIG. 4 that has been frozen for shipping and storage prior to baking.

As shown in FIG. 4, at the molding station 42, plastic dies 44, mounted on reciprocating hydraulic actuators, move vertically to engage within the openings 26 and to press against the dough ball 36. The dies 44 form the dough at pressures in the range of from about 2,500 psi to about 3,200 psi into a desired molded shape. A preferred pressure is about 2,900 psi. At these pressures, the substrate 122 is brought into intimate contact with the dough and adheres thereto.

Figure 8:
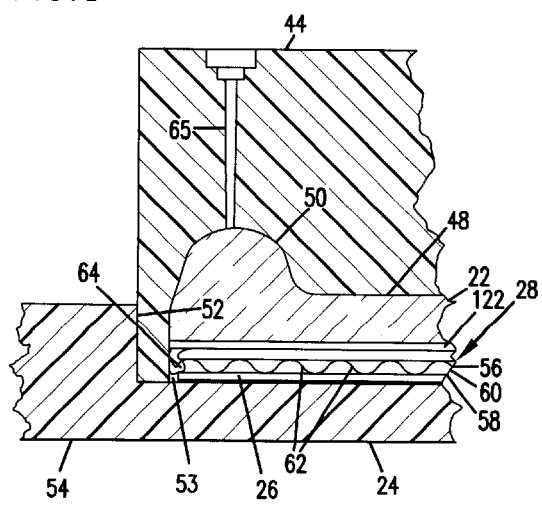
FIG. 8 is a fragmentary cross-sectional view showing the dough being formed on the substrate and corrugated perform and showing an air-injection hole for facilitating dough release.

As shown in FIG. 8, typically the molded shape will be a flat circular pizza center 48 with an upwardly extending peripheral pizza rim 50. In a preferred embodiment, the preforms 28 are smaller in diameter than the openings 26, to allow a die 44 to extend into the opening between the vertical cylindrical sidewall 52 of the opening 26 and the circular preform 28. A horizontal gap 53 is defined between the downwardly extending lip 54 of the die 44 and the preform 28. The gap 53 is approximately one-eighth of an inch between the preform and the die in a preferred embodiment. The preform 28 is preferably a die-cut corrugated paperboard or cardboard circle.

As shown in FIG. 8, the preform 28 is comprised of a top layer of paperboard 56, a bottom layer of paperboard 58, and a central corrugated layer of paperboard 60. The corrugated layer 60 is bent in a generally sinusoidal configuration, and glued to the top and bottom layers 56, 58, to define a plurality of parallel corrugations 62 that open sidewardly from the preform 28. The corrugations 62 provide bulk and stiffness to the preform 28 with reduced weight. However, the process of this invention additionally utilizes the corrugations 62 to secure the dough formed in the die 44 to the preform 28 so that it will retain its desired molded shape once the elevated pressures within the die have been relieved.

As dough typically has elastic properties, it will have a tendency to retract away from the edges of the preform 28. The portions 64 of the dough which are pressed under the high pressure of the molding step into the corrugations 62 retain the pizza rim 50 at the perimeter of the preform 28. The engagement of the dough portions 64 with the sidewardly opening corrugations counteracts the tendency of the dough to retract, and ensures that the desired dough molded shape is maintained until the dough can be frozen.

As shown in FIG. 6, once the dough has been molded into a pizza crust 22 air is injected through channels 65 above the pizza rim 50 and the pizza center 48 to facilitate release of the crust 22 from the die 44. The molded crusts 22 are conveyed in the tray 24 from the molding station 42 to a docking station 66 where metal dies form an array of narrow diameter depressions 59 in the formed crust 22. This docking is conventional in the baking industry and facilitates better and more consistent baking and rising.

In a preferred embodiment the trays 24 have an array of four pin holes (not shown) that extend beneath the openings 26 through which ejection pins extend to elevate the cardboard preforms and the raw crusts secured thereto out of the trays. The elevated preform-crust assemblies 67, shown in FIG. 5, may then be manually placed on a cart or rack for transfer to a freezer 68, or they may be transferred to a separate conveyer that leads to a freezer. The crusts 22 may be filled with pizza ingredients prior to entering the freezer if the crusts are intended for purchase by an end consumer, or may be left unfilled if the crusts are intended for pizzeria or other pizza-maker's use.

From the freezer 68 the dough product assemblies 120, consisting of the dough product 22 and the baking substrate 122, in conjunction with the preform 28 are packaged at a packaging station 70, typically by being wrapped in plastic and stacked in boxes for freezer car shipment to the purchaser as shown in FIG. 6.

It is important to note that at no time is the crust 22 baked in full or in part. Because the dough is secured to the cardboard preform, it will retain its desired shape as it is conveyed from the molding station to the freezer. By avoiding any baking the flavor and texture of the fresh dough is preserved. In addition, a substantial savings in heating and cooling costs is realized. First, the energy required to bake the molded dough prior to freezing is saved, and second, the energy required to cool down the baked dough is also conserved. Not only is the expense of the added heating and cooling saved, but also the capital expenditures for an oven and a more powerful freezer are eliminated. In addition, Federal Environmental Protection Agency regulations in certain high pollution areas require bakeries to take costly emission regulations in certain high pollution areas require bakeries to take costly emission abatement measures to address the concern of gas emissions from larger baking ovens. A bakery producing bread products of this invention does not produce the baking gases that are subject to control, and hence eliminates expenses related to compliance. In short, the process of this invention allows not only an improved dough product, but allows that product to be produced at reduced cost.

When it is desired to prepare the crust 22 for consumption, the frozen crust-baking substrate-cardboard preform assembly is removed from the freezer, and the preform is separated from the crust 22 and the baking substrate 122. The frozen crust 22 and engaged baking substrate 122 are placed in an oven and baked in a conventional manner. Because the proofed dough has been frozen without any baking, the yeast within the dough has never been subjected to elevated temperatures that would kill the yeast. Hence, in the baking process the dough will raise a certain amount before being fully baked. The result is a crust that maintains many of the properties of a freshly baked crust, while offering the convenience and transportability of a frozen crust.

During baking, in one embodiment the larger openings 124 in the edible baking substrate 122 serve as infrared radiation admitting apertures that allow the radiant heat of the oven to directly strike the dough, thus contributing to the rapid browning of the dough product and a crisper baked product. Prior art prepared dough products which were partially or completely baked prior to being frozen, are relatively stable and uniform when they reach the consumer's oven. The dough product of this invention, however, is first exposed to baking when it is placed, still frozen, into the consumer's oven. If conditions are not optimal in the consumer's oven, there is a risk that a frozen dough product will thaw unevenly prior to baking, and hence result in excessive moisture in some regions of the product. For example, in the pizza crust illustrated, there is a tendency for the outer region to rise and direct moisture to the central region of the crust. To counteract areas of higher moisture, the holes in the baking substrate, as shown in FIG. 14, reveal a crust periphery are spaced further from one another to block radiant heating. The end result is a more evenly baked bread product.

Figure 15:
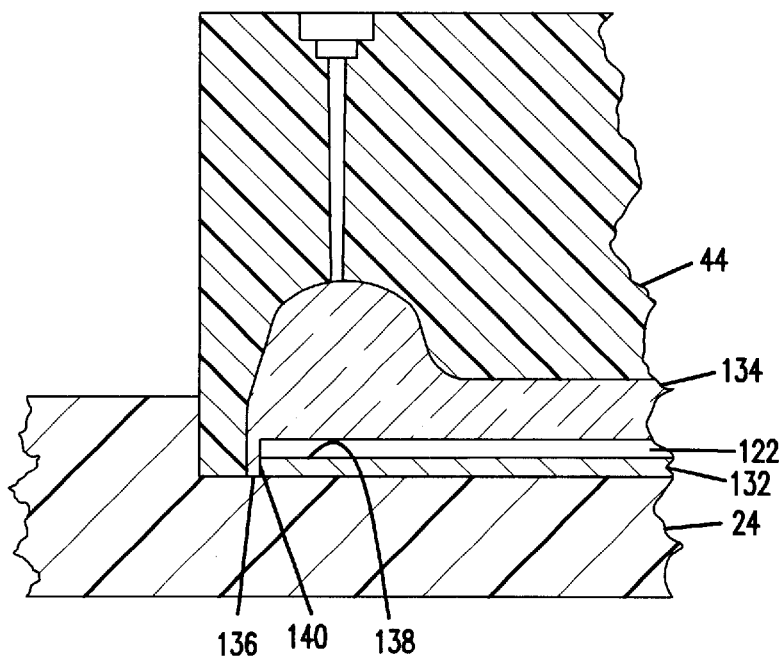
FIG. 15 is a fragmentary cross-sectional view of an alternative embodiment of the invention.

Alternatively, as shown in FIG. 15, a non-corrugated paperboard preform 132 may also be employed in forming the dough products of this invention. The term "paperboard" is used herein to refer to any fibrous paper product, including composite paper articles such as corrugated material, or single uncorrugated paper products. Recycled paperboard, or other stiff paper product may be employed as a preform 132. Although the non-corrugated preform lacks openings which engage with the formed dough product 134, because the preform is of a diameter less than that of the forming die 44, dough will be extended between the sides of the die and the generally vertical side wall 140 of the preform which extends downwardly from the top surface 138 of the preform 132. The substrate 122 is sandwiched between the preform 132 and the crust 134 as shown. The extended portion of dough 136 locks around the perimeter of the substrate 122 and the preform 132, thus preventing the formed dough from retracting inwardly on the top surface 138 of the preform.

Figure 9:
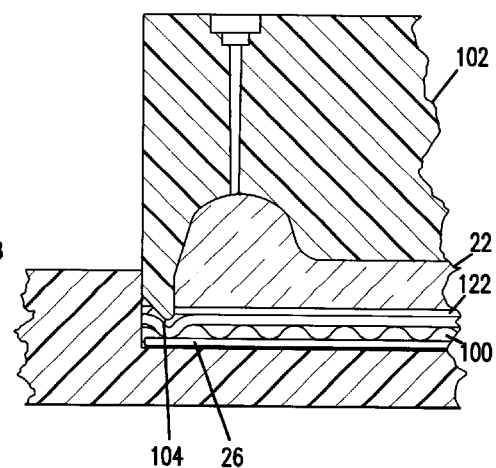
FIG. 9 is a fragmentary cross-sectional view of an alternative embodiment dough-forming die, substrate and preform with dough formed thereon of this invention.

An alternative embodiment of the process of this invention employs a preform 100 that is nearly the same diameter as the opening 26 and a molding die 102 at the molding station that has a downwardly protruding rib 104. The rib 104, shown in FIG. 9, is positioned above the preform 100 so that when the die 102 is pressed down into the opening, dough is distributed beneath the rib 104 and is pressed into the preform 100 by the rib 104. Again, the substrate 122 is sandwiched between the dough 22 and the perform 100. The rib 104 dimples the corrugated preform 100 and locks the dough in place to hold the desired molded shape during transport and freezing of the dough as described above.

Figure 10:
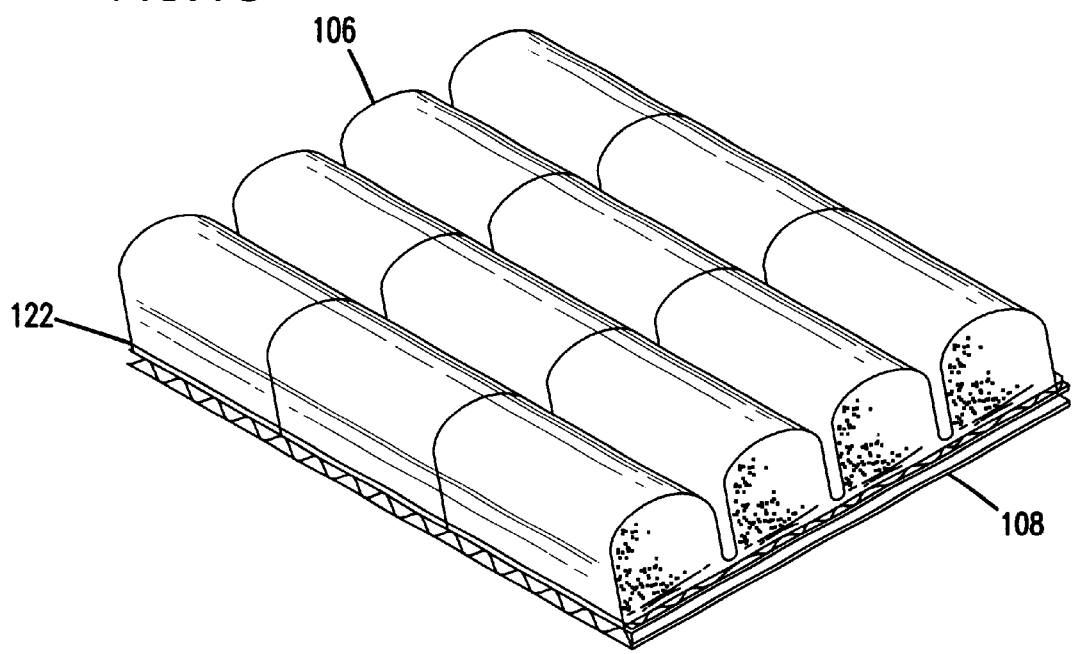
FIG. 10 is an isometric view of an alternative dough product formed in the process of this invention.

It should be noted that, although pizza crusts with raised rims have been illustrated as the dough product produced in the processes of this invention, flat pizza crusts and other types of bread products may also be prepared for freezing. Rolls or buns 106, as shown in FIG. 10, may be molded on a rectangular preform 108 with a substrate 122 pressed in between. A rectangular baking substrate 122 may be positioned between the dough and the perform 108. Portions of the dough extend into the exposed corrugations of the preform 108 and lock the molded dough in place.

Figure 11:
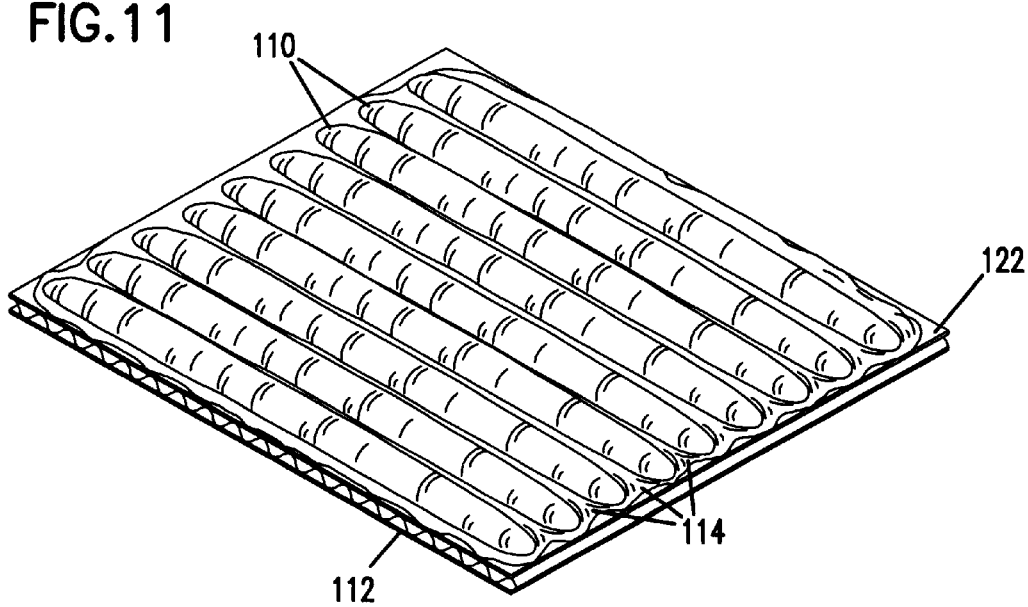
FIG. 11 is an isometric view of another alternative dough product formed in the process of this invention.

As another example, bread sticks 110, shown in FIG. 11, may be formed using the process illustrated in FIG. 9 that employs a die with a rib which depresses portions of the dough into a depression in the preform 112 surrounding the bread product. The bread sticks 110 may be formed on the substrate 122 and perform 112 and then frozen. Preferably the bread sticks are formed as a single molded shape, with individual sticks joined by a narrow, reduced height, bridge 114 of dough. When it is desired to prepare an individual bread stick, one may be separated from the group by breaking the stick 110 and the attached substrate 122 off along the bridge, and placing the assembly in an oven for baking.

Figure 12:
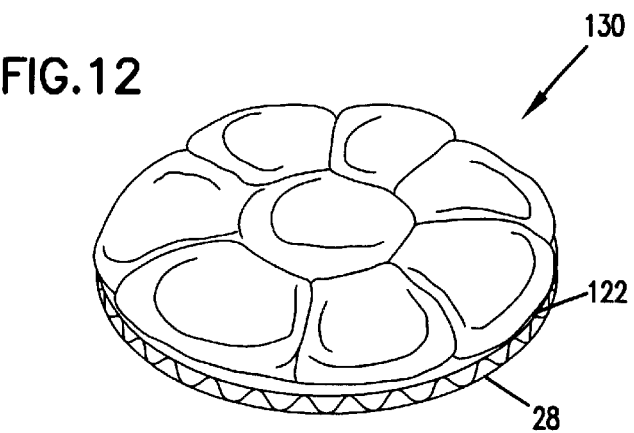
FIG. 12 is a perspective view of another alternative dough product formed in the process of this invention.

Another dough product is shown in FIG. 12. Generally circular rolls 130 may be formed on a circular substrate 122 and preform 28. Again, the product 130 and substrate 122 are preferably separated from the preform 28 before baking.

The film for the substrate 122 may be preferably manufactured by the following steps: laying a pliable film (preferably a slurry or paste comprised of: 93% water; and 7% solids) on a conveyor, flattening the film with a rolling drum, drying the film, and preparing the film for transport. Additional film forming steps may include: rolling the film into rolls prior to transport, transporting the film, unrolling the film rolls, and cutting the film into shapes appropriate for use with frozen dough products. Nevertheless, it will be apparent to one of ordinary skill in the art other methods of manufacturing the inventive edible film could be used such as those described in U.S. Pat. No. 5,817,381, which is hereby incorporated by reference.

There are virtually innumerable uses for the present invention, all of which need not be detailed here. Moreover, all the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the individual components need not be formed from the disclosed materials, in the disclosed shapes, or assembled in the disclosed configuration, but could be fabricated from virtually any suitable materials, could be provided in virtually any shape, and assembled in virtually any configuration.

Further, although various steps and machines are described herein as physically separate modules, it will be manifest that they may be integrated into the steps or apparatus with which they are associated. Furthermore, all the disclosed features of each disclosed embodiment can be combined with, or substituted for, the disclosed features of every other disclosed embodiment except where such features are mutually exclusive.

The terms upper, lower, top, bottom and the like in the specification and claims are intended to assist the reader in understanding the invention and are not intended as terms of limitation.

It should be noted that bread products and other raised dough products may be formed in the process of this invention using a wide variety of ingredients and dough recipes. Furthermore, preforms of various thickness and shape may be employed, including single and double corrugated paperboard. Similarly, substrates of various compositions and thickness are possible.

It is understood that the invention is not limited to the particular embodiments disclosed and illustrated herein, but embraces such modified forms thereof as come within the scope of the following claims.

It is intended that the appended claims cover all such additions, modifications and rearrangements. Expedient embodiments of the present invention are differentiated by the appended subclaims.

What is claimed is:

1. A dough product support assembly comprising:
   a portion of dough; and
   an edible fibrous film for supporting the portion of dough wherein the film includes: wheat starch, L-cysteine hydrochloride, and ammonium sulfate.

* * * * *